(12) United States Patent
Back et al.

(10) Patent No.: US 10,006,544 B2
(45) Date of Patent: Jun. 26, 2018

(54) TRANSMITTER FOR A MANUAL TRANSMISSION FOR A MOTOR VEHICLE, ASSEMBLY WITH TRANSMITTER, TRANSMISSION SHAFT AND TRANSMISSION GEAR AS WELL AS TRANSMISSION

(71) Applicant: HOERBIGER Antriebstechnik Holding GmbH, Schongau (DE)

(72) Inventors: Ottmar Back, Weilheim (DE); Peter Echtler, Schongau (DE)

(73) Assignee: HOERBIGER Antriebstechnik Holding GmbH, Schongau (DE)

( * ) Notice: Subject to any disclaimer, the term of this patent is extended or adjusted under 35 U.S.C. 154(b) by 235 days.

(21) Appl. No.: 15/040,464

(22) Filed: Feb. 10, 2016

(65) Prior Publication Data
US 2016/0238131 A1 Aug. 18, 2016

(30) Foreign Application Priority Data
Feb. 13, 2015 (DE) .................. 10 2015 102 141

(51) Int. Cl.
| | | |
|---|---|---|
| F16D 23/06 | (2006.01) | |
| F16H 63/30 | (2006.01) | |
| F16D 23/02 | (2006.01) | |
| F16D 23/04 | (2006.01) | |

(52) U.S. Cl.
CPC ............ *F16H 63/30* (2013.01); *F16D 23/025* (2013.01); *F16D 23/04* (2013.01); *F16D 2023/0618* (2013.01); *F16D 2023/0631* (2013.01); *F16H 2063/3093* (2013.01)

(58) Field of Classification Search
CPC ........ F16D 23/025; F16D 23/04; F16D 23/06; F16D 23/0606; F16D 2023/0618; F16D 2023/0625; F16D 2023/0631; F16H 63/30; F16H 2063/3093
See application file for complete search history.

(56) References Cited

U.S. PATENT DOCUMENTS

| | | | |
|---|---|---|---|
| 2,978,083 A * | 4/1961 | Henyon | ............. F16D 23/0606 192/114 R |
| 5,641,044 A | 6/1997 | Morscheck | |
| 6,196,944 B1 | 3/2001 | Schmitz | |
| 2012/0181138 A1 * | 7/2012 | Echtler | ................. F16D 23/025 192/108 |

FOREIGN PATENT DOCUMENTS

| | | |
|---|---|---|
| BE | 522159 A | 9/1953 |
| DE | 19851895 A1 | 5/2000 |

(Continued)

OTHER PUBLICATIONS

German Office Action dated Feb. 19, 2016 from corresponding Application No. DE 10 2015 102 141.2, along with unofficial English translation, 6 pages.

*Primary Examiner* — Richard M Lorence
(74) *Attorney, Agent, or Firm* — Dilworth IP LLC (57) ABSTRACT

A transmitter for producing a rotationally fixed connection between a transmission shaft and a transmission gear rotatably mounted on the transmission shaft comprises a transmitter disk and a clutch toothing associated with the transmitter disk. The transmitter disk is provided with a transmitter toothing on its outside.

16 Claims, 5 Drawing Sheets

(56) References Cited

FOREIGN PATENT DOCUMENTS

| | | | |
|---|---|---|---|
| DE | 69614329 T2 | 5/2002 | |
| DE | 10343074 A1 | 4/2005 | |
| DE | 102010036282 A2 | 3/2012 | |
| EP | 1447581 A1 | 8/2004 | |
| FR | 2830301 A1 | 4/2003 | |
| GB | 1183801 A * | 3/1970 | ......... F16D 23/0606 |
| JP | 2014-214825 A | 11/2014 | |

* cited by examiner

TRANSMITTER FOR A MANUAL TRANSMISSION FOR A MOTOR VEHICLE, ASSEMBLY WITH TRANSMITTER, TRANSMISSION SHAFT AND TRANSMISSION GEAR AS WELL AS TRANSMISSION

This invention relates to a transmitter for a manual transmission, in particular a transmitter for a manual transmission of a motor vehicle, an assembly with transmitter, transmission shaft and transmission gear as well as a transmission.

BACKGROUND OF THE INVENTION

In manual transmissions, as they are used in particular in motor vehicles, the synchronising assembly serves to produce a rotationally fixed connection between a transmission shaft and a transmission gear or gear wheel arranged on the transmission shaft as idler gear. In a first step of the shifting operation, the synchronizing assembly ensures that the speed of the transmission gear to be shifted is adapted to the speed of the transmission shaft. In a second step, a rotationally fixed connection between the transmission shaft and the transmission gear then is produced. The corresponding gear then is engaged.

What is generally known are synchronizing assemblies which as essential components include a synchronizer hub, thrust pieces accommodated therein, synchronizer rings as well as a selector sleeve. Upon actuation of the selector sleeve, one of the synchronizer rings is pressed against a friction surface, which is associated with the transmission gear to be shifted, via the thrust pieces and/or via the blocking bevels. When the speed of the transmission gear is synchronized with the speed of the transmission shaft, the selector sleeve can be shifted through completely, so that it engages into a toothing associated with the transmission gear. In this way, a rotationally fixed connection is produced from the synchronizer hub to the transmission gear.

What is also known are synchronizing assemblies which instead of a synchronizer hub also employ a so-called transmitter, which generally speaking combines the function of the synchroniser hub, the thrust pieces and the selector sleeve. The basic construction of a transmission with such synchronizing assembly will be explained below with reference to FIGS. 1 to 8.

Figure 1:
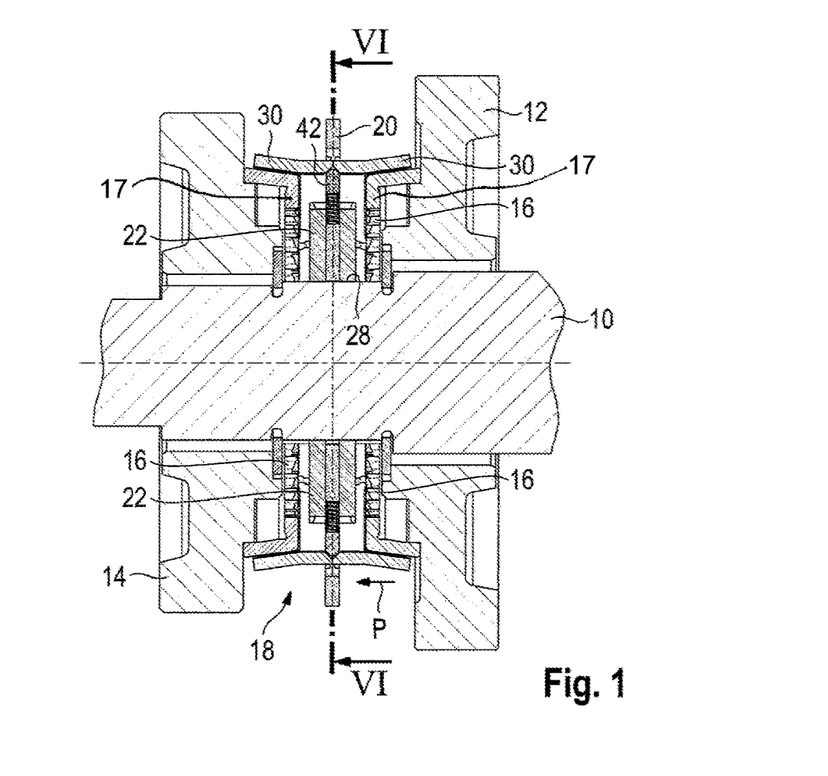
FIG. 1 in a section schematically shows a synchronising assembly known from the prior art.
Figure 2:
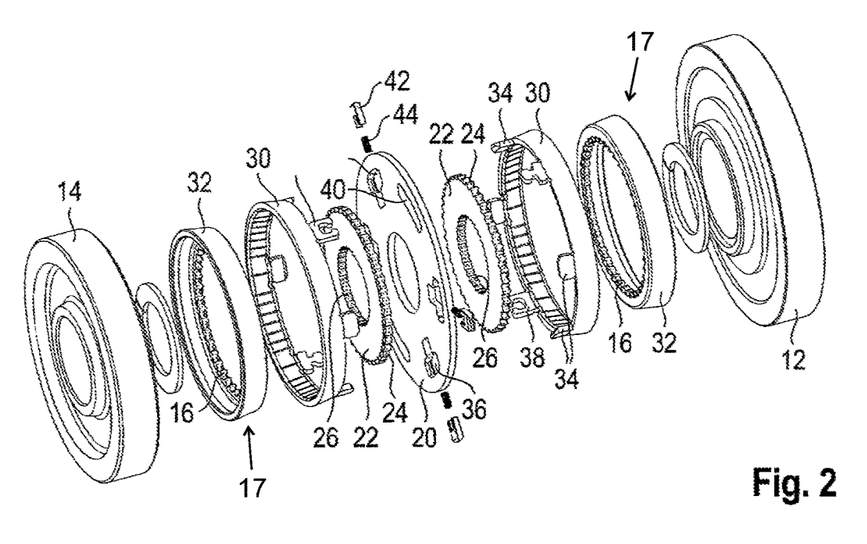
FIG. 2 in an exploded view shows the synchronizing assembly of FIG. 1.
Figure 3:
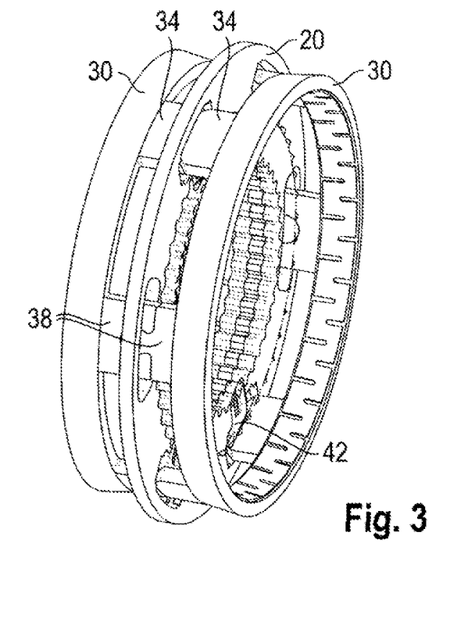
FIG. 3 in a perspective view shows a transmitter with synchronizer rings mounted thereon.
Figure 4:
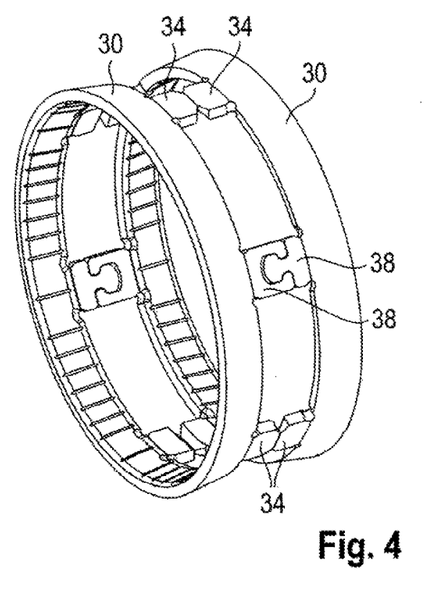
FIG. 4 in a perspective view shows the synchronizer rings of FIG. 3.
Figure 5:
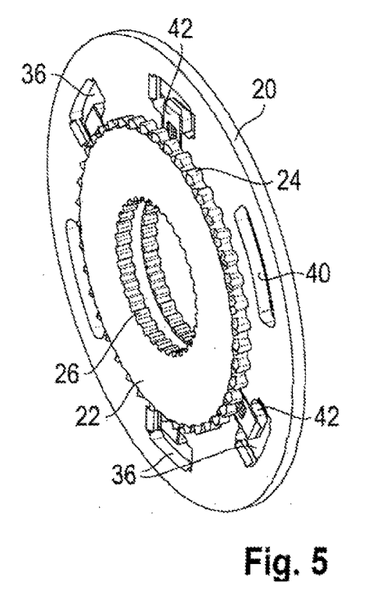
FIG. 5 in a perspective view shows the transmitter of FIG. 3.
Figure 6:
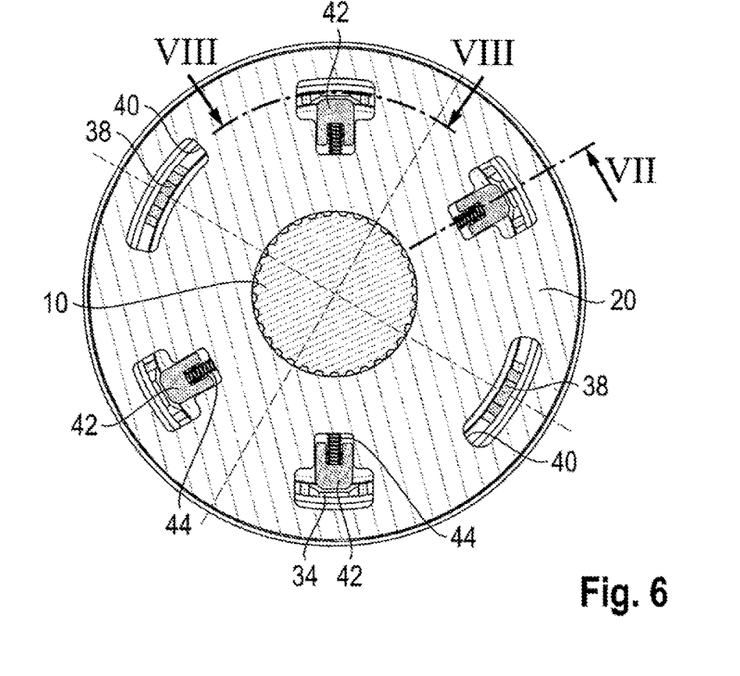
FIG. 6 shows a section along the plane VI-VI of FIG. 1.
Figure 7:
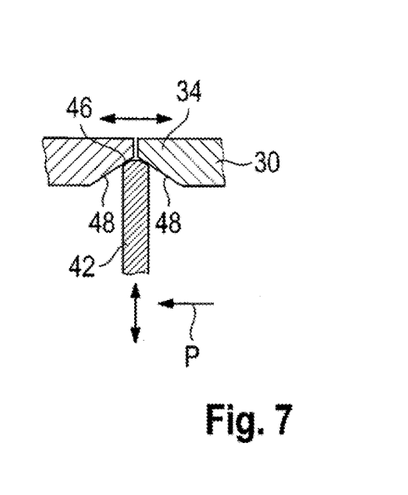
FIG. 7 shows a section along the plane VII of FIG. 6.

The transmission contains a transmission shaft 10 on which two transmission gears 12, 14 are arranged. The two transmission gears 12, 14 are designed as idler gears, i.e. can rotate relative to the transmission shall. To each transmission gear 12, 14 a transmission gear toothing 16 is non-rotably associated. The same is provided as internal toothing on a separate component 17 which is firmly connected with the corresponding transmission gear 12, 14.

Between the two transmission gears 12, 14 a transmitter 18 is arranged, which here is formed by a transmitter disk 20 and two clutch disks 22. The two clutch disks 22 are arranged on the one and on the other side of the transmitter disk 20 and include a clutch disk external toothing 24 as well as a clutch disk internal toothing 26. The external toothing 24 is designed complementary to the transmission gear toothing 16, and the internal toothing 26 is in engagement with a transmission shaft toothing 28. Thus, the clutch disks 22 are non-rotatably coupled with the transmission shaft 10 in circumferential direction, but can be shifted on the transmission shaft in an axial direction.

On the one and on the other side of the transmitter disk 20 a synchronizer ring 30 is arranged, which can cooperate with a friction surface 32 associated with the corresponding transmission gear 12, 14. The two synchronizer rings include several carriers 34, which extend in recesses 36 in the transmitter disk 20, and two diametrically opposed connecting tabs 38 which extend through connecting openings 40 in the transmitter disk 20 (see in particular FIG. 3). The connecting tabs 38 serve to couple the two synchronizer rings with each other in an axial direction. In the coupled condition (see FIG. 4), the free ends of the carriers 34 of the two synchronizer rings 30 closely face each other.

In each of the recesses 36 a thrust piece 42 (see in particular FIGS. 5 and 6) is arranged, which is each urged to the outside in radial direction by a spring 44. At the radially outer end of each thrust piece a pre-synchronizing surface 46 is formed, which rests against pre-synchronizing bevels 48 formed at the free ends of the earners 34 on the radially inner side (see FIG. 7). The pre-synchronizing bevels 48 of the opposed carriers 34 are aligned such that a V with large opening angle is formed, whose tip points radially to the outside.

At the carriers 34 blocking surfaces 50 are formed, which as seen in circumferential direction oppose the edges of the recess 36 in an oblique alignment. Here as well, the blocking surfaces 50 form a V at the opposed carriers 34, wherein the tip of the two Vs of the opposed carriers is directed towards the center of the recess 36.

The described synchronizing assembly operates in the following way: When a gear is to be engaged, for example the one which contains the transmission gear 14, the transmitter 18 is shifted on the transmission shaft 10 in an axial direction by a means of a shift fork (not shown) in direction of the arrow P of FIG. 1. In a first step, which is called pre-synchronization, the two synchronizer rings 30 are carried to the left by the thrust pieces 42, more exactly by the pre-synchronizing surface 46 of the thrust piece 42 engaging the left pre-synchronizing bevel 48 of the left synchronizer ring 30, so that the synchronizer ring 30 gets into frictional engagement with the friction surface 32.

Figure 8:
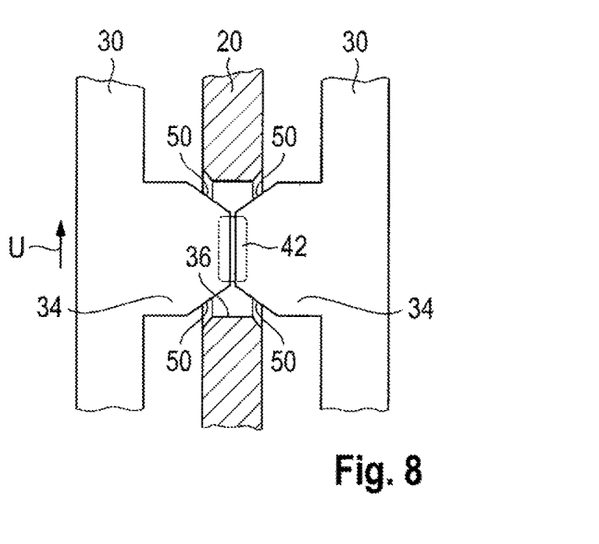
FIG. 8 shows a section along the plane VIII of FIG. 6.

The speed of the transmission shaft 10 usually does not correspond to the speed of the transmission gears so that there is a speed difference between the synchronizer ring 30 and the friction surface 32. This results in the synchronizer ring being carried along in circumferential direction (see the arrow U in FIG. 8), whereby the blocking surface 50 gets in contact with the upper edge of the recess 36 as shown in FIG. 8. Due to the oblique alignment of the blocking surface 50, there is produced a force component which prevents shifting of the transmitter disk 20 relative to the earner 34; as long as a speed difference exists, the resulting friction moment leads to the fact that the blocking surface 50 remains pressed against the edge of the recess 36. The synchronizer ring supports on the friction surface 32 and cannot be shifted further in an axial direction.

The blocking force exerted by the blocking surface 50 only decreases when the speed difference is decreased, so that the edge of the recess 36 of the transmitter disk 20 can shift the blocking surface 50, due to its oblique alignment, in circumferential direction opposite to the direction of the arrow U, which provides for shifting through the transmitter. At the same time, the thrust pieces 42 are compressed downwards by the obliquely attached pre-synchronizing bevels 48 against the action of the spring 44. The transmitter thereby can axially be shifted to such an extent that the external toothing 24 of the clutch disk 22 engages into the transmission gear toothing 16 associated with the transmission gear 14, in this way, a rotationally fixed connection between the transmission shaft 10 and the transmission gear 14 to be engaged is produced.

In contrast to the illustrated embodiment it also is sufficient when a blocking chamfer defined exactly in terms of length and angle is present only at one components for example. A complementary chamfer at the opposed component, e.g. transmitter, is advantageous for a full contact with the blocking chamfers. In principle, one of the two chamfers for example might also be omitted or be designed crowned.

For releasing the shifted gear, the transmitter 18 is shifted back into its neutral position in opposite direction, whereby the two synchronizer rings 30 also are again set back into a neutral position. In this position, the fractional engagement with the friction surfaces 32 is eliminated.

It is the object underlying the invention to develop the known synchronizing assemblies to the effect that a more compact construction is obtained.

BRIEF DESCRIPTION OF THE INVENTION

In order to achieve this object, the invention provides a transmitter for producing a rotationally fixed connection between a transmission shaft and a transmission gear rotatably mounted on the same with a transmitter disk and a clutch disk associated with the transmitter disk. The transmitter includes a clutch disk external toothing, and the transmitter disk is provided with a transmitter toothing on its outside. The invention is based on the principle of forming one of the toothings, which previously were provided on the clutch disk, directly on the transmitter disk. Thus, the transmitter toothing is located outside the synchronizer rings, which provides for a shorter installation space in an axial direction.

According to one aspect of the invention it is provided that the transmitter toothing is arranged on the outer circumference of the transmitter disk. This results in the shortest possible construction in an axial direction since the transmitter toothing coincides with the transmitter disk as seen in an axial direction.

It can furthermore be provided that two synchronizer rings are mounted on the transmitter disk. The attachment of the synchronizer rings and the necessary design of the transmitter disk remain unchanged, which results in a small constructional effort as compared to the previously known construction of the transmitter.

Preferably, it is provided that an actuating element is coupled to the transmitter disk in an axial direction. The actuating element provides for shifting the transmitter disk in an axial direction without having to engage the outer circumference of the transmitter disk, as has been necessary so far.

According to one aspect if is provided that the clutch toothing is provided on a clutch disk which is associated with the transmitter disk. This provides for forming the transmitter disk as flat component, in particular as stamped sheet-metal component, since the clutch toothing is provided on a separate component.

Preferably, it is provided that the clutch disk is arranged on a front side of the transmitter disk and is connected with the same in an axial direction, it is not necessary that the clutch disk is non-rotatably connected with the transmitter disk such that the torque between transmission shaft and engaged transmission gear is transmitted via the clutch disk and the transmitter disk; it is sufficient to connect the clutch disk with the transmitter disk such that the clutch disk follows the axial movements of the transmitter disk. The torque can be transmitted from the clutch toothing directly to the transmission shaft, in that the clutch disk is provided with a toothing on its inside which engages into a complementary toothing of the transmission shaft.

The above-mentioned object is also achieved according to the invention by means of an assembly with a transmission shaft, at least one transmission gear rotatably mounted on the same and a transmitter as mentioned above, wherein the transmission gear is provided with a transmission gear toothing with which the transmitter toothing can be brought in engagement. With the transmitter according to the invention, two transmission gears furthermore can be coupled with the gear shaft, wherein the torque is transmitted from the transmission shaft to one of the transmission gears via the clutch disk and to the other transmission gear via the transmitter disk. This provides for arranging the transmission gears closer to each other in an axial direction.

According to one aspect of the invention it is provided that an actuating element engages the transmitter disk, which proceeding from the transmitter disk extends in an axial direction. This actuating element leaves the installation space around the transmitter toothing empty, so that no allowance must be made for an installation space for actuation of the transmitter disk.

The actuating element can extend around the transmission shaft in the manner of a sleeve. This results in a small constructional effort.

Alternatively it can be provided that the actuating element is arranged within the transmission shaft. This provides for actuating the transmitter also when it is difficult to access on the outside in an axial direction, for example because it is arranged between several pairs of transmission gears.

Preferably it is provided that the actuating element is coupled with the transmitter disk through an opening in the transmission shaft. For this purpose a small window is sufficient, by which the transmission shaft is not substantially weakened.

According to one aspect of the invention it is provided that the transmission gear is provided with a transmission gear toothing with which the transmitter toothing can be brought in engagement. This results in a direct torque transmission from the transmitter disk to the corresponding transmission gear.

The transmission gear toothing can be designed integrally with the transmission gear. The costs for the assembly of a separate component thereby are avoided.

Alternatively it can be provided that the transmission gear toothing is provided on the inner circumference of a transmission gear toothed washer, which is non-rotatably connected with the transmission gear. This provides for producing the transmission gear toothing on a sheet-metal component to be manufactured at low cost, for example by stamping, which subsequently (possibly after a hardening operation) is connected with the transmission gear.

According to one aspect it is provided that the transmission gear is provided with a friction surface which can cooperate with a synchronizer ring. This provides for maintaining the previously known construction as far as possible, so that only little modifications are necessary.

Preferably, the friction surface is provided directly on the transmission gear. This reduces the number of components necessary altogether.

The friction surface can be directed radially to the outside. It can also be provided that the friction surface is directed radially to the inside. This can be chosen optimally in dependence on the respective marginal conditions.

According to one aspect of the invention it is provided that the friction surface is arranged radially within the transmission gear toothing. This results in a compact construction in an axial direction.

The above-mentioned object is furthermore achieved according to the invention by means of a transmission with an assembly as mentioned above, wherein the transmission includes a housing which is provided with a blocking toothing with which the transmitter toothing can be brought in engagement in this aspect, the transmitter disk is used to produce a rotationally fixed connection between the transmission shaft and the housing of the transmission, so that the transmission is blocked for example in a parking position. For the function of the parking brake, other than in embodiments used for synchronizing, no synchronizer ring is necessary on the side of the transmitter disk on which the engagement with the transmission housing is effected.

BRIEF DESCRIPTION OF THE DRAWINGS

The invention will be described below with reference to various embodiments which are shown in the attached drawings, in which.

DETAILED DESCRIPTION OF THE INVENTION

Figure 9:
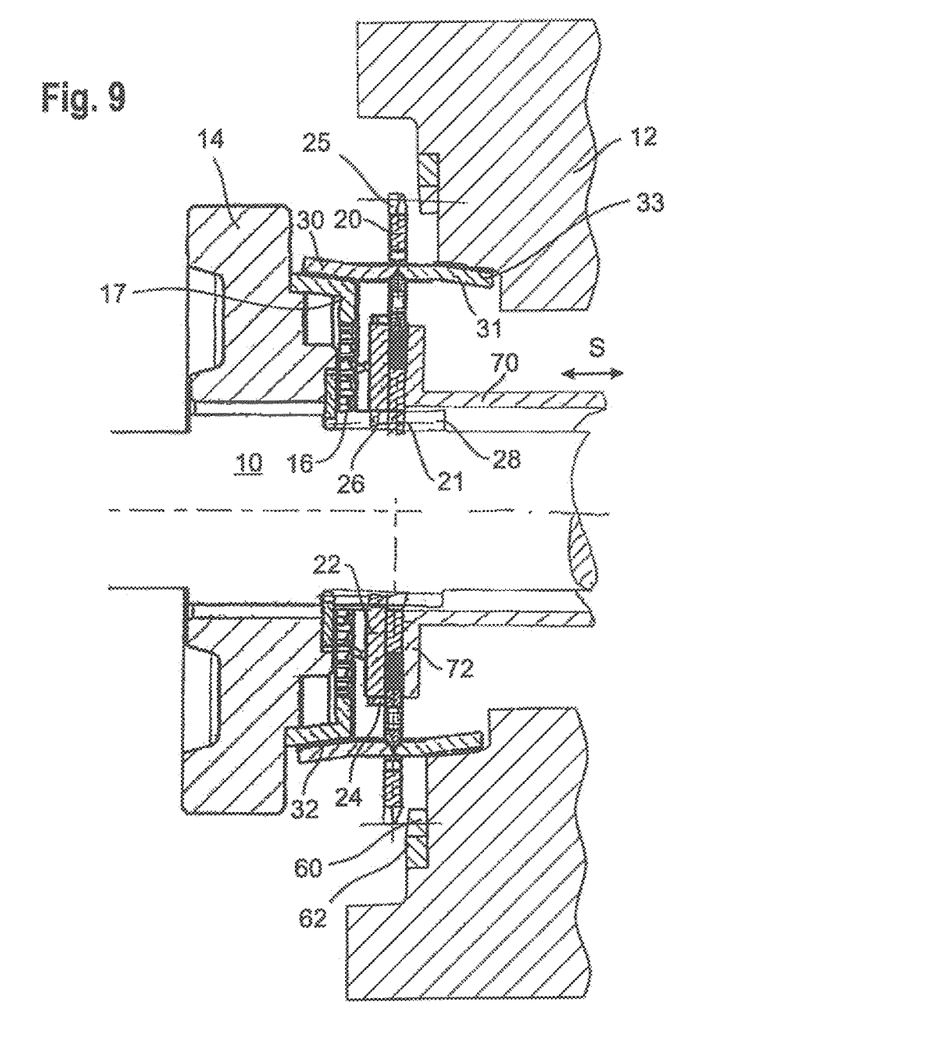
FIG. 9 in a section schematically shows a part of a transmission according to a first embodiment of the invention.

With reference to FIG. 9 a first embodiment of a transmitter according to the invention now will be described. For the components which are known already from FIGS. 1 to 8 the same reference numerals are being used, and in so far reference is made to the above explanations.

The essential difference between the assembly as it is shown in FIG. 9 and the assembly known from FIGS. 1 to 8 is that the torque transmission between the transmitter disk 20 and one of the transmission gears (here the transmission gear 12) is not effected via a clutch disk with clutch disk toothing, but by a transmitter toothing 25 formed on the transmitter disk 20.

The transmitter toothing 25 here is provided directly on the transmitter disk 20, namely in the form of teeth on the outer circumference of the transmitter disk.

The transmitter disk 20 with the transmitter toothing 25 can be formed as flat component for example of sheet metal which is stamped.

A further difference between the transmitter disk 20 used in the embodiment according to FIG. 9 and the transmitter disk known from FIGS. 1 to 8 is that in the embodiment according to FIG. 8 the transmitter disk is provided with a transmitter disk internal toothing 21. Similar to the clutch disk internal toothing 26, the same non-rotatably, but axially shiftably engages into the transmission shaft toothing 28.

On the transmission gear 12 a transmission gear toothing 60 is provided, with which the transmitter toothing 25 can be brought in engagement. The transmission gear toothing 80 here is provided on a transmission gear toothed washer 62 which is non-rotatably connected with the transmission gear 12, for example by welding.

The transmission gear toothed washer 62 can be a stamped sheet-metal component, which possibly is hardened at least in the region of the transmission gear toothing 60.

Alternatively, it is also possible to form the transmission gear toothing 60 integrally with the transmission gear 12.

In the embodiment shown in FIG. 9, the transmitter disk 20 also carries two synchroniser rings 30, 31. In contrast to the embodiment shown in FIGS. 1 to 8, the two synchronizer rings however have a different geometry. The synchronizer ring 30 slightly flares conically to the outside proceeding from the transmitter disk 20 so that it can be pushed onto the conical friction surface 32 directed to the outside, which is provided on the component 17. The synchronizer ring 31 on the other hand tapers in an axial direction away from the transmitter disk 20 so that it can be pushed into a conical friction surface 33 directed radially to the inside, which is formed on the transmission gear 12.

The friction surface 33 here is formed as shoulder on the transmission gear 12, i.e. integrally with the same. In principle, however, it also is possible to form a separate component on the transmission gear 12, on which the friction surface then is provided.

The transmitter disk 20 is engaged by an actuating element 70 with which the transmitter disk 20 can be shifted on the transmission shaft 10 in an axial direction. The actuating element 70 performs the function of a shift fork which in the embodiment according to FIGS. 1 to 8 engages the outside of the transmitter disk 20, in order to shift the same in an axial direction.

In the embodiment according to FIG. 9, the actuating element 70 is designed in the manner of a sleeve which surrounds the transmission shaft 10. The actuating element 70 engages the transmitter disk 20 with a flange 72 which is arranged at the point where the second clutch disk 22 is arranged in the embodiment according to FIGS. 1 to 8.

With regard to the mode of operation during synchronizing and shifting gears, the embodiment according to FIG. 9 does not differ from the embodiment according to FIGS. 1 to 8. When the transmitter disk 20 is actuated in one direction proceeding from the neutral position (see the arrow S), the two synchronizer rings 30, 31 are carried along in the corresponding direction. The synchronizer ring located "at the front" in shifting direction gets in engagement with the corresponding friction surface 32, 33, and the process of synchronizing starts. When the speeds of the transmission shaft and the corresponding transmission gear 12, 14 are adapted to each other, the transmitter disk 20 can be shifted through, so that either when the transmission gear 12 is shifted, the torque is transmitted from the transmission shaft 10 via the transmitter disk internal toothing 21, the transmitter disk 20, the transmitter toothing 25 and the transmission gear toothing 60 to the transmission gear 12, or when the transmission gear 14 is shifted, the torque is transmitted from the clutch disk internal toothing 26 via the clutch disk 22 and the clutch toothing 24 to the component 17 and from the same to the transmission gear 14.

The advantage of the embodiment according to FIG. 9 as compared to the embodiment according to FIGS. 1 to 8 is in particular that a more compact construction is possible in an axial direction. As can be seen in FIG. 9, the teeth of the transmission gear 12 can be arranged very close to the transmitter disk 20 in an axial direction. In the embodiment shown, the running teeth of the transmission gear 12 protrude beyond the transmitter disk 20. This is possible because the arrangement of the transmission gear toothing and the friction surface on the transmission gear are interchanged as compared to the embodiment according to FIGS. 1 to 8. The friction surface 33 on the transmission gear 12 is arranged radially within the transmission gear toothing 60, and the transmission gear toothing 60 is arranged closer to the transmitter disk than the friction surface 33.

It is not absolutely necessary to couple the actuating element 70 laterally within the synchronizer rings 30, 31. It might also be provided that radially outside the synchronizer rings 30, 31 on the side of the transmission gear 14 an add-on part is provided at the transmitter disk 20, with which laterally of the transmitter toothing 25 a groove or a circumferential edge is formed so that a sliding block or a shift fork can engage there.

Figure 10:
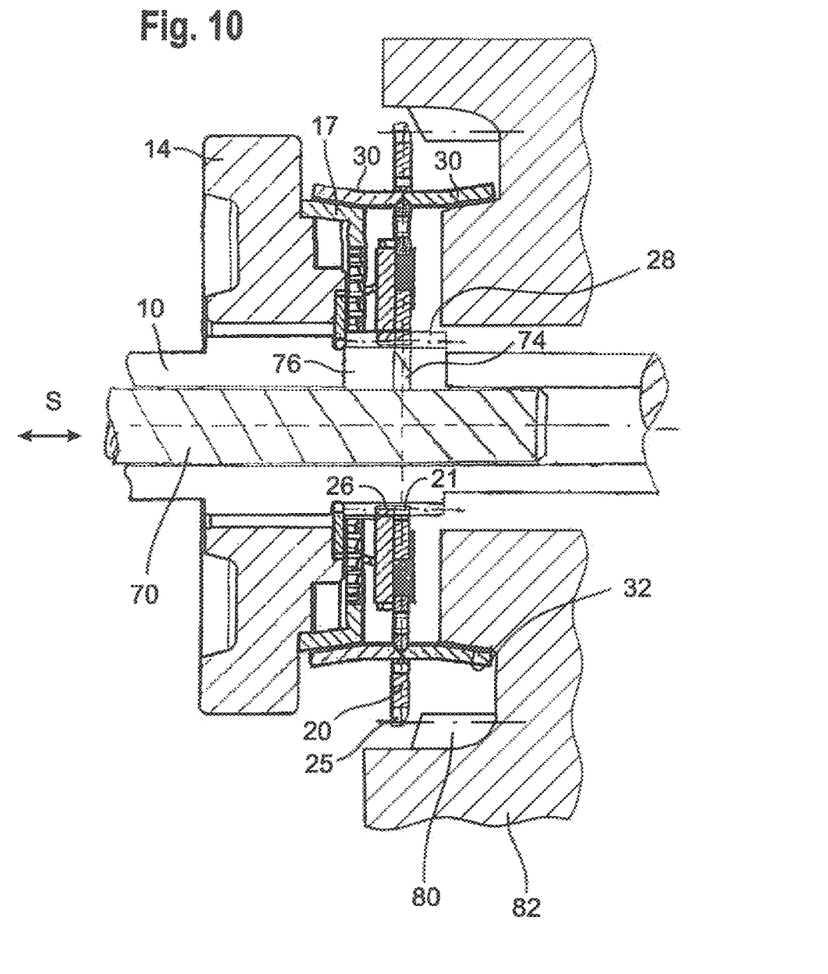
FIG. 10 in a view corresponding to the one of FIG. 8 shows a second embodiment of the invention.

FIG. 10 shows a further embodiment. For the components known from the preceding embodiments the same reference numerals are used, and in so far reference is made to the above explanations.

The difference between the embodiment according to FIG. 10 and the embodiment according to FIG. 9 is that in the embodiment according to FIG. 10 the transmitter merely engages one transmission gear (here the transmission gear 14). When the transmitter disk 20 is shitted to the right proceeding from the neutral position shown in FIG. 10, it gets in engagement with a blocking toothing 80 provided on a housing 82 of the transmission, in which the transmission shaft 10 is mounted.

The blocking toothing 80 here is designed integrally with the housing 82. It also is possible to provide the blocking toothing 80 similar to the transmission gear toothing 60 in the embodiment according to FIG. 9 on a separate component which then is mounted on the housing 82.

A further difference between the embodiment according to FIG. 10 and the embodiment according to FIG. 9 is that in the embodiment according to FIG. 10 the actuating element 70 is arranged within the transmission shaft 10. It is provided with an actuating tab 74 which extends radially to the outside through an opening 76 in the transmission shaft 10 and is connected with the transmitter disk 20.

In the embodiment according to FIG. 10 a friction surface 32 is provided on the housing 82, which in the same way as the friction surface 32 on the component 17 is directed radially to the outside. Thus, two synchronizer rings 30 with identical geometry can be arranged on the transmitter disk.

When the transmitter disk 20 in the embodiment according to FIG. 10 is shifted to the left starting from the illustrated neutral position, a shifting operation is effected in a known way with the transmission gear 14. When the transmitter disk 20 however is shitted to the right, a kind of synchronizing operation is effected, which leads to the fact that the speed of the transmission shaft 10 is brought to zero until finally the transmitter disk 20 can be shifted through. The transmission shaft 10 thereby is non-rotatably blocked in the housing 82 via the transmission shaft toothing 28, the transmitter disk internal toothing 21, the transmitter toothing 25 and the blocking toothing 80.

According to a non-illustrated development, the actuating element 70 arranged within the transmission shaft also can be used in the embodiment according to FIG. 9, in which two transmission gears are shifted with the transmitter disk. Conversely, the sleeve-like actuating element 70 known from the embodiment of FIG. 9 also can be used in the embodiment according to FIG. 10, in which the transmitter disk can be brought in engagement with the blocking toothing 80.

Furthermore, in the embodiment according to FIG. 9 there can also be used a friction surface 32 directed radially to the outside, as it is used in the embodiment according to FIG. 10. Conversely, in the embodiment according to FIG. 10 a friction surface 33 directed radially to the inside can be used on the side of the housing 82, as it is known from the embodiment according to FIG. 9.

The invention claimed is:

1. A transmitter for producing a rotationally fixed connection between a transmission shaft and a transmission gear rotatably mounted on said transmission shaft, said transmitter comprising a transmitter disk and a clutch toothing associated to said transmitter disk, said transmitter disk being provided with a transmitter toothing at an outer circumference of said transmitter disk wherein said clutch toothing is provided on a clutch disk, wherein said clutch disk is arranged on a front side of said transmitter disk and is connected with said transmitter disk in an axial direction.

2. The transmitter of claim 1 wherein two synchronizer rings are mounted on said transmitter disk.

3. The transmitter of claim 1 wherein an actuating element is coupled to said transmitter disk in axial direction.

4. An assembly with a transmission shaft, a transmission gear rotatably mounted on said transmission shaft, and a transmitter for producing a rotationally fixed connection between said transmission shaft and said transmission gear rotatably mounted on said transmission shaft, said transmitter comprising a transmitter disk and a clutch toothing associated to said transmitter disk, said transmitter disk being provided with a transmitter toothing at an outer circumference of said transmitter disk, wherein an actuating element engages said transmitter disk, said actuating element extending in an axial direction proceeding from said transmitter disk, and wherein said actuating element is either arranged around said transmission shaft in a manner of a sleeve or is arranged within said transmission shaft.

5. The assembly of claim 4 wherein said actuating element is arranged around said transmission shaft in a manner of a sleeve.

6. The assembly of claim 4 wherein said actuating element is arranged within said transmission shaft.

7. The assembly of claim 6 wherein said actuating element is coupled with said transmitter disk through an opening in said transmission shaft.

8. The assembly of claim 4 wherein said transmission gear is provided with a transmission gear toothing with which said transmitter toothing can be brought in engagement.

9. The assembly of claim 8 wherein said transmission gear toothing is designed integrally with said transmission gear.

10. The assembly of claim 8 wherein said transmission gear toothing is provided on an inner circumference of a transmission gear toothed washer which is non-rotatably connected with said transmission gear.

11. The assembly of claim 8 wherein said transmission gear is provided with a friction surface which can cooperate with a synchronizer ring.

12. The assembly of claim 11 wherein said friction surface is provided directly on said transmission gear.

13. The assembly of claim 11 wherein said friction surface is directed radially to the outside.

14. The assembly of claim 11 wherein said friction surface is directed radially to the inside.

15. The assembly of claim 11 wherein said friction surface is arranged radially within said transmission gear toothing.

16. A transmission comprising an assembly with a transmission shaft, a transmission gear rotatably mounted on said transmission shaft, and a transmitter for producing a rotationally fixed connection between said trans-mission shaft and said transmission gear rotatably mounted on said transmission shaft, said transmitter comprising a transmitter disk and a clutch toothing associated to said transmitter disk, said transmitter disk being provided with a transmitter toothing at an outer circumference of said transmitter disk, wherein said clutch toothing is provided on a clutch disk, wherein said clutch disk is arranged on a front side of said transmitter disk and is connected with said transmitter disk in an axial direction, and further comprising a housing which is provided with a blocking toothing with which said transmitter toothing can be brought in engagement.

\* \* \* \* \*